W. PATTON.
DISPENSING APPARATUS.
APPLICATION FILED JAN. 22, 1915.
1,193,180.
Patented Aug. 1, 1916.
5 SHEETS—SHEET 3.
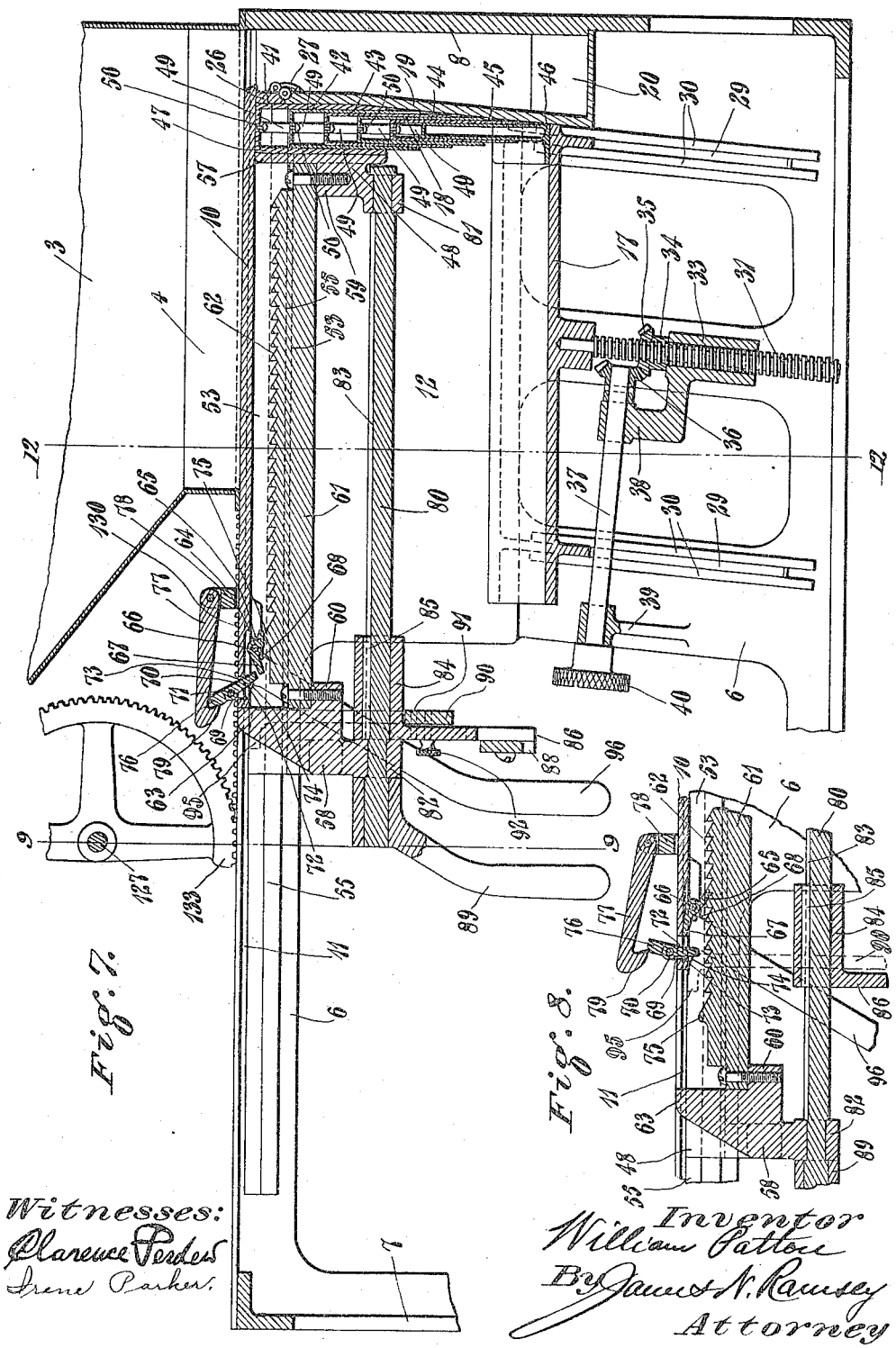
Witnesses:
Clarence Perdew
Irene Parker.
Inventor
William Patton
By James N. Ramsey
Attorney

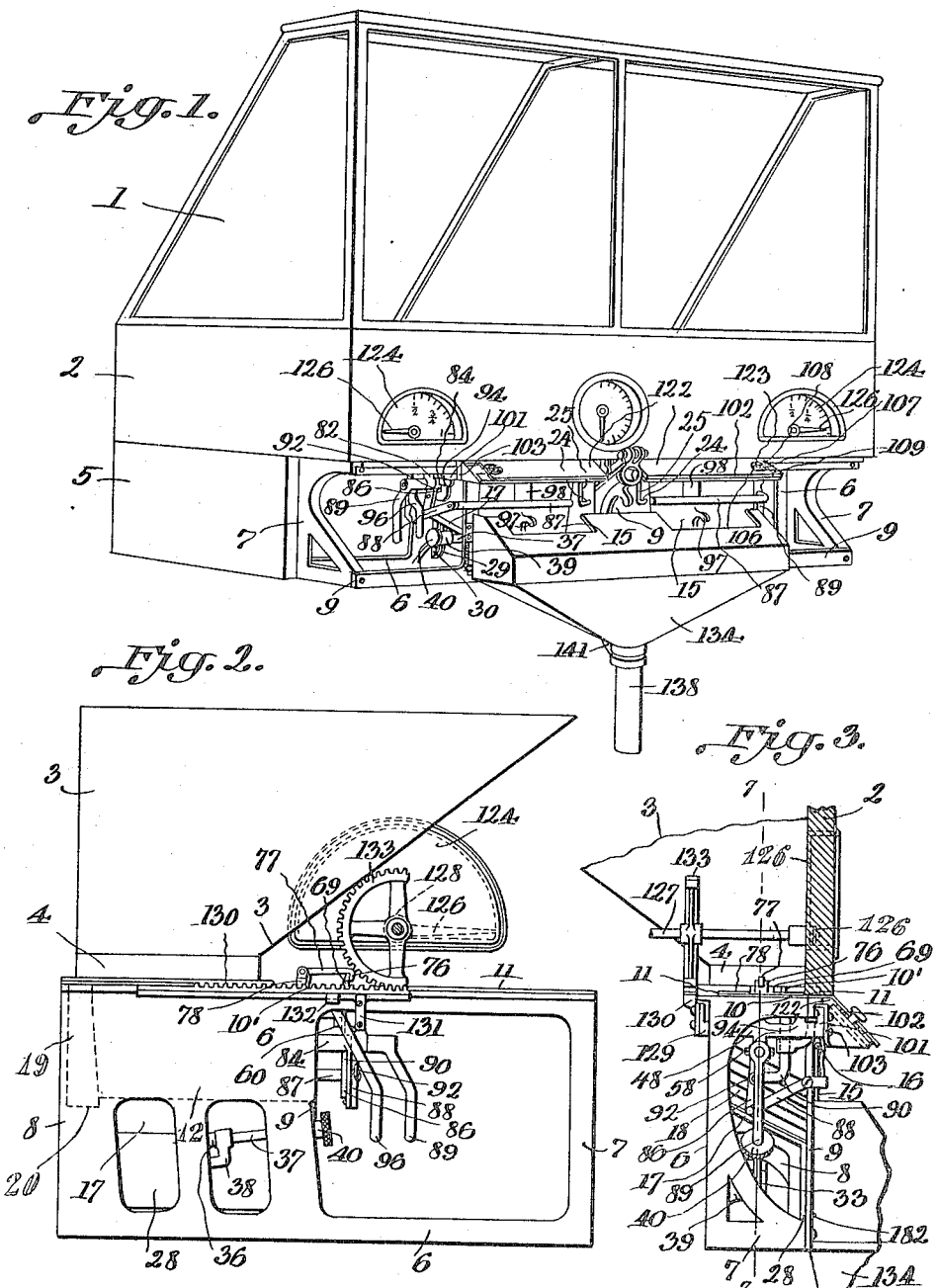

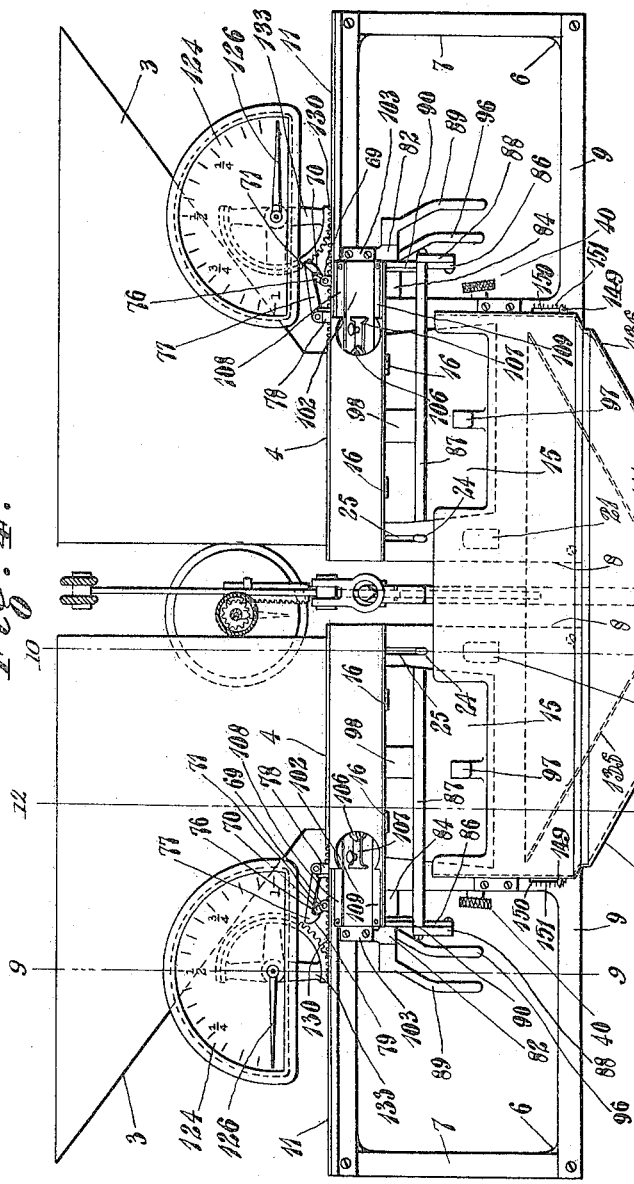

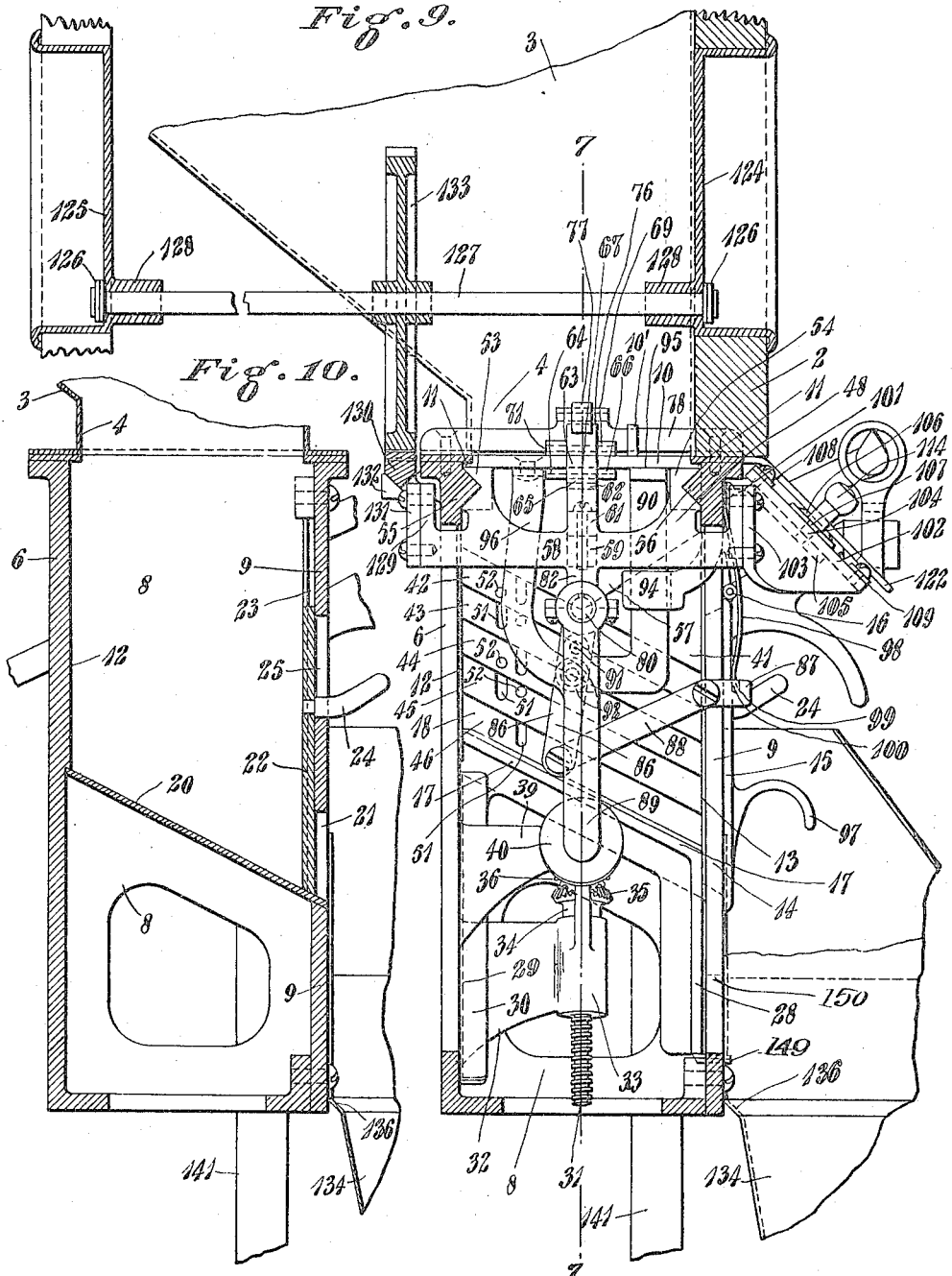

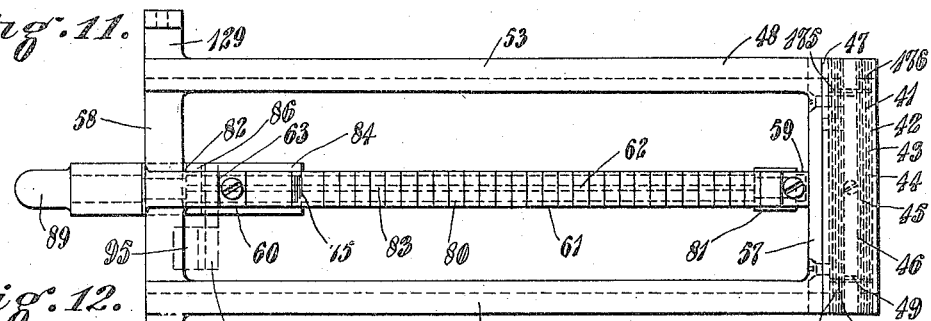

UNITED STATES PATENT OFFICE.

WILLIAM PATTON, OF CINCINNATI, OHIO, ASSIGNOR OF ONE-THIRD TO ALBERT G. BECK, OF CINCINNATI, OHIO, AND ONE-THIRD TO CHARLES WEBER, OF CINCINNATI, OHIO.

DISPENSING APPARATUS.

1,193,180. Specification of Letters Patent. Patented Aug. 1, 1916.

Application filed January 22, 1915. Serial No. 3,800.

*To all whom it may concern:*

Be it known that I, WILLIAM PATTON, a citizen of the United States, and a resident of Cincinnati, in the county of Hamilton and State of Ohio, have invented certain new and useful Improvements in Dispensing Apparatus, of which the following is a specification.

My invention relates to dry measures; and its object is to facilitate accurate measurement of quantities of granular materials or similar commodities with regard to their weights and specific gravities as well as their values or prices.

My invention consists of the parts and of the details of construction and arrangement of parts as will hereinafter be more fully described and claimed.

In the drawings: Figure 1 is a general perspective view of a bin provided with my improved apparatus; Fig. 2 is a rear elevation of one of my apparatus removed from the bin; Fig. 3 is a left side elevation of the same; Fig. 4 is a front elevation of two of my apparatus removed from the bin, but arranged as shown in Fig. 1; Fig. 5 is an enlarged detail view of part of the chart and its shield and indicator and locking device; Fig. 6 is a section on the line 6—6 of Fig. 5; Fig. 7 is a partial vertical longitudinal section on the line 7—7 of Fig. 3 or Fig. 9; Fig. 8 is a partial view similar to Fig. 7 showing the operation of the slide-controlling device; Fig. 9 is a partial vertical cross section on a line corresponding to the line 9—9 of Fig. 4 or Fig. 7; Fig. 10 is a similar cross section on a line corresponding to the line 10—10 of Fig. 4; Fig. 11 is a detail plan view of the carriage and parts which it carries; Fig. 12 is a partial vertical cross section on a line corresponding to the line 12—12 of Fig. 4 or Fig. 7; Fig. 13 is a similar view showing a different adjustment with regard to the specific gravity of the commodity dispensed; and Fig. 14 is a detail view of one of the shells of the adjustable end.

In the example of the use of my invention as herein shown, a bin 1 is provided, which may be of well known construction with transparent sides for displaying the contents, below which the bin may have a bottom section 2 which will contain the sloping bottom or hopper 3 with a downwardly projected outlet neck 4 through which the contents of the bin may be discharged. It will be understood, however, that any suitable container for the commodity may have an outlet similar to the neck 4; or the commodity may be stored at some distance from the place where it is to be dispensed and led to the dispensing apparatus by pipes or conduits which may discharge through such a neck as the neck 4. It is the purpose of my invention to so control and regulate the discharge from the neck 4 that any desired quantity or weight of the commodity may be secured by simple manipulation and with the liability for inaccuracy and mistakes minimized.

With the bin 1 as herein shown and above described, there may be a suitable base 5 from which the bottom section 2 overhangs, leaving a space in which the main parts of the dispensing apparatus are mounted.

Preferably, the complete set of apparatus is so arranged that it may include not only a dry measuring device but also, supplementing this device, a weighing device or scale into which the dry-measuring device discharges, so that the accuracy of the measurement with reference to actual weight may be proven in each instance, if it be desired, or be required by the law of the community in which the apparatus is used.

As shown in Figs. 1 and 4, two distinct dry-measuring devices are associated with a bin which has two distinct compartments with hoppers 3 and necks 4 discharging to the respective devices, associated with which is a single discharging means and scale. Such an arrangement produces a symmetrical structure and allows of economy in that a single scale apparatus may be provided, and since it is not often that it is desired to use both measuring devices at the same time, there is practically no loss in convenience due to this arrangement. However, it will be understood that a single bin may be provided with a single dry-measuring device and with a scale or weighing apparatus for each dry-measuring device; or, where it is not desired or required to verify the accuracy of the dry measurement by weighing, the scale apparatus may be omitted.

The dry-measuring device, as I have exemplified it herein, comprises a rear frame member 6, ends 7 and 8 and a front frame member 9. The general formation of this framework, made up of these parts 7, 8 and 9 being rectangular, and the top of the framework being flat and adapted to be fitted up against the lower side of the overhanging part of the bottom section 2 of the bin 1 previously alluded to, and being so proportioned with respect to the bin and its bottom or hopper 3 that the neck 4 of the hopper will coincide with the space between the rear and front frame members 6 and 9 near the end 8 thereof, which will be termed the inner end. Where two such devices are associated with a single bin as above set out, their respective parts will be oppositely disposed, so that this inner end 8 of the device will be at the right on the one and at the left on the other. The devices are slightly separated to admit the scale apparatus. From Fig. 7 to the end of the series of figures, inclusive, the left hand device is selected for illustration of the details, so that this inner end part, under the neck 4 of the hopper, is at the right.

A slide 10 with its upper and lower sides smooth, is mounted horizontally between the frame members in suitable longitudinal guideways 11 on the inner sides thereof near their upper edges. The smooth upper side of the slide fits closely against the lower end of the neck 4 when the slide 10 is pushed toward the inner end of the device, and the slide thus forms a closure or cut-off between the hopper 3 or other supply means and the interior of the device. The inner end of the rear frame member 6, for a considerable distance down from its top has a smooth inner side 12. The inner end of the front frame member 9 has a similar smooth inner side 13, which, however, is provided with an outlet or door opening 14, which has a door or shutter 15 with hinges 16 at its upper side, to open outwardly. Between these two smooth sides 12 and 13 is mounted the bottom 17 which, in order to readily discharge the contents through the door-opening 14 has its upper surface smooth and sloped at a suitable angle from the side 12 down to the side 13 and the door opening 14. Fitting into this space between the sides 12 and 13 and the bottom 17 and under the slide 10 is the adjustable outer end 18, which, by being slid outward, will create and define a measuring space under the slide 10. By pulling the slide 10 out from under the discharge means, there will be discharged into the measuring space enough of the commodity, under the impulse of the weight of the commodity in the bin or other container or conduit, to fill the space thus created and defined. By governing the size of this space, different quantities or weights of the commodity may be accurately cut off from the main body of the commodity by the slide 10, and then by opening the door 15 may be discharged from the device and dispensed for sale or use.

The inner end 8 of the frame is closed from its top downward a considerable distance, and an additional inner end 19 is spaced outward therefrom, thus forming the inner end of the measuring space. Extending back from the side of this inner end 19 to the inner end 8 of the frame is a bottom 20, inclined at about the angle that the bottom 17 is, thus forming a separate narrow space at the rear end of the device, communicating at its top with the source of supply of the commodity. In the front 13, with its bottom coinciding with the front end of the sloping bottom 20, is a small outlet 21 with a door 22 that slides upward in guides 23 on the inner side of the front 13, inside said narrow space, and with a handle 24 extending forward through a slot 25. The slide 10 is adapted to extend over the upper edge of the inner side 19 of the measuring space, but to leave the communication between this narrow space and the neck 4 opens at all times; and of course this narrow space will always be occupied by some of the commodity. The small outlet 21, opened by sliding up the door 22, will allow this commodity to pass from the narrow space outward independently of the slide 10 and the door 15 that control the passage of the commodity through the measuring space, so that slight additions of the commodity to the measured amount may be made where desired or necessary. Furthermore, the stoppage of the slide 10 slightly over the additional inner end 19 permits the slide thus to stop within an ample body of the commodity, so that choking or jamming of any of the commodity between the end of the slide and the end of the device is avoided. To obviate clogging when the commodity consists of rather large particles, the upper part 26 of the additional inner end 19 may be hinged to the lower part and normally held upright by a spring 27, which, however, will yield and allow this part to swing over into the narrow space under the impact of any large particles caught between it and the inner end of the slide 10, while at the same time no excess of the commodity can pass into the measuring space, when this space is emptied through the opening of the door 15.

It will be understood that not only is it necessary to adjust the size of the measuring space on each occasion for the particular amount required, but, if the measured quantity is to have its weight guaranteed, it must also be possible to adjust this space with regard to the density or specific gravity of the particular commodity being measured or weighed. If the commodity be comparatively dense, the size of the measuring space must be correspondingly decreased to measure the required amount with regard to its weight. My invention therefore comprehends not only an adjustment at each different dispensation, but another adjustment, to remain throughout a series of dispensations, and only to be changed when a new commodity or a new lot of the same kind of commodity is to be dispensed, or should it be found that the density of the same lot has changed for any reason, as by absorption of moisture or by drying out. In the present case, I prefer to provide for this compensation by making the sloping bottom 17 adjustable up and down between the sides 12 and 13, and, in connection with this, making the adjustable end 18 collapsible and thereby adjustable to the up-and-down adjustment of the bottom 17, as well as adjustable along this bottom as hereinbefore mentioned.

The forward part of the bottom 17 is provided with an apron 28, extending down inside the door opening 14 far enough so that at any upward adjustment of the bottom 17 this apron will extend across and cover the lower part of the door opening 14. At the back the bottom 17 has legs 29 lying in guides 30 on the lower part of the rear frame member 6, and by this means the bottom is guided in its up-and-down adjustment.

To adjust the bottom 17 up and down, it has, fixed in it, near its middle on its lower side, a downwardly extending screw stud 31, and a bracket 32 extending forward from the inside of the rear frame member 6 has a hub 33 in which the screw stud 31 may slide and be guided. Threaded on this screw stud 31 above the hub 33 is a nut 34 which also comprises a bevel gear 35. Another bevel gear 36 meshes with this bevel gear 35 of the nut 34, and is fixed on a stem 37 that extends outwardly and has bearings in an arm 38 on the forward side of the hub 33 and in a bracket 39 extending forward from the inner side of the rear frame member 6 near the outer end of the bottom 17. Outside this bracket 39 the stem 37 has a knob 40 that may be grasped for turning the stem, and through the meshing of the bevel gears, thus turn the nut 34 which acts against the screw stud and hub 33 to raise the bottom 17.

The adjustable outer end 18, as here shown, is made collapsible by constructing it of a number of telescoping shells 41, 42, 43, 44 and 45 and a foot 46. The shells are of inverted U-shaped cross section, with their tops horizontal, but with its lower edges oblique in accordance with the sloping of the bottom 17. The largest shell 41 is at the top, and each shell, in the order above mentioned, is of decreasing width so that it will fit into the shell above it. The foot 46 bears closely against the inclined upper smooth side of the bottom 17, while the uppermost shell 41, which preferably is made of somewhat heavier material than the others, has its inner leg 47 fixed to the inner end of a carriage 48, which will be described in detail hereinafter. A flat spring 49 is placed between the flat tops of each two adjacent U-shaped shells, with its middle fastened to the under side of the upper section in each instance by a rivet 50, and with its free ends bearing at opposite sides of the upper surface of the top of the lower section in each instance, as indicated by the dotted lines in Figs. 12 and 13. To guide the shells with respect to each other independently of the sides 12 and 13, each shell may have a slot 51 in its outer leg near the back of the device, through which a rivet 52 extends inwardly from the adjacent upper shell. Thus constructed, when the bottom 17 is adjusted upward, this outer end 18 will collapse against the pressure of the springs 49. This will hold the smooth foot 46 tightly against the smooth bottom 17. The front and rear edges of the shells are accurately fitted to the smooth inner surfaces of the sides 12 and 13, and the upper surface of the uppermost section 41 is accurately fitted to the lower smooth surface of the slide 10. Thus, this end of the measuring space will be fully closed at all adjustments of this outer side 18.

The inner legs of the shells may be swaged or tapered slightly to avoid giving this inner side a pronounced stepped formation, but even then, this inner side will slant inwardly from the lower edge of the uppermost section 41 to the bottom 17. Should the inner end 19 of the space be vertical from top to bottom, this slant will create a small space of triangular cross section which would be additional to the desired measuring space. This small additional space would not vary in proportion to the variation of this measuring space caused by inward and outward adjustment of the adjustable end 18, and therefore would result in inaccuracy in the measurement. To compensate for this, I slant the inner end 19 to conform to the inner side of the adjustable outer end 18, as is best seen in Fig. 7. Since the inner end of the bottom 17 must fit closely against this inner end 19 at all of its up-and-down adjustments, the legs 29 and their guides 30 as well as the screw stud 31, and the hub 33 are also inclined, parallel to this inclined inner end 19. Preferably, the stem 37 is also inclined, so that the bevel gears 35 and 36 may be simple miter gears.

The carriage 48, previously mentioned, is of general rectangular formation with elongated rear and front members 53 and 54, each with an outside groove of V-shaped cross section running longitudinally and receiving guides 55 and 56 on the insides of the frame members 6 and 9, near their tops. Such guides, with slanting sides, will not catch and hold any of the commodity as it passes down into the measuring space. These rear and front sides 53 and 54 are joined at the inner end of the frame by an end plate 57, to which the outer leg of the uppermost section 41 of the adjustable end 18 is fixed, while at the front end of the frame is a cross-piece 58 joining the rear and front members 53 and 54.

The end plate 57 has an outwardly extending bracket 59 and the cross piece 58 has an inwardly extending bracket 60, which brackets 59 and 60 support respective ends of a ratchet bar 61 up under the slide 10, with ratchet teeth 62 projected upwardly and with their engaging sides toward the outer end of the device. The cross piece 58 also has, projecting upwardly, a stop 63 which will be engaged by the outer end of the slide 10 to limit the outward movement of the slide with respect to the carriage 48 and the adjustable end 18 which it carries. This end of the slide 10 has, on its under side, a pair of lugs 64 with a pawl 65 pivoted between them on a pin 66 to swing in a vertical plane. This pawl extends downwardly and inwardly, and, when dropped down, engages with the teeth 62 of the ratchet bar 61 to prevent movement of the slide 10 inwardly with respect to the carriage 48 and the end 18 which it carries. This pawl 65 has a nose 67 extending forwardly, against the lower side of which a spring 68 presses to force the pawl down against the ratchet teeth 62. Farther out near the end of the slide 10, on its upper side, are another pair of lugs 69 with a detent 70 pivoted between them on a pin 71 to swing in a vertical plane. This detent 70 has a part 72 projecting downwardly and inwardly through an opening 73 in the slide, so that when swung inwardly it may engage over the upper side of the outer end of the nose 67 and hold the pawl 65 up away from the ratchet teeth 62. Another spring 74 bears against the outer side of this downward extension 72 of the detent 70, thus normally holding it inward toward the pawl 65. When the pawl 65 is riding over the teeth 62 during an outward movement of the slide 10 with respect to the carriage 48, the inner side of this downward extension 72 will be bearing against the outer end of the nose 67 of the pawl and allowing the pawl to move up and down in passing over the teeth; but if the pawl 65 be raised far enough to bring the outer end of the nose 67 down far enough, the spring 74 will push the downward extension 72 over the top of the nose, and the pawl will then be held up out of position for engagement with the teeth 62 until the detent 70 is again swung outward. To swing the pawl 65 upward this required distance, the ratchet bar 61 has at the outer termination of the series of teeth 62, a lug 75 that extends considerably higher than do the teeth 62, which, upon the lower side of the pawl engaging therewith, will bring the nose 67 down far enough for the downward extension 72 of the detent 70 to come over it. Then the slide 10 may be pushed inward relative to the carriage 48 and the end 18 which it carries. This lug 75 that causes this is so placed relative to the stop lug 63 for the slide 10 that it thus renders the ratchet inoperative at about the same instant that the outer end of the slide 10 strikes the stop lug 63. Thus it will be impossible to start the slide 10 inward to cut the commodity off until it has been brought outward to the full extent required to give the full opening between the inner end 19 of the measuring space and the adjustable outer end 18, whatever position that outer end may have been adjusted to. The detent 70 also has an upward extension 76; and a releasing hook 77 is fulcrumed on a bracket 78 that is mounted on the top of the frame of the device, spanning the slide 10, this hook extending outwardly and having an inclined lower outer end 79 adapted to engage with and slide up over the inner side of the upward extension 76 of the detent 70 and then drop down and hook over the outer side of this upward extension 76. This hook 77 is so positioned that it will thus act with respect to the detent when the slide 10 has been pushed fully inward and has come over the inner side 19 of the measuring space and completely cut off the commodity. With the hook 77 thus dropped down over the upward extension 76 of the detent 70, the next time the slide 10 is pulled outward the hook 77 will detain the upper end of the extension 76 of the detent, so that the outward motion of the slide 10 will cause an outward motion of the downward extension 72 of the detent, disengaging it from the upper side of the nose 67 of the pawl 65 and allow the pawl 65 to again come into engagement with the ratchet teeth 62. The slide 10 is provided with a stop 10' on its upper side near its outer end to engage with the bracket 78 to limit the inward movement of the slide.

Running longitudinally under the ratchet bar 61 and middle of the carriage 48 is a shaft 80 journaled in a bearing 81 on the lower end of the bracket 59 at the inner end of the carriage, and in a bearing 82 on the lower side of the cross-piece 58 at the outer end of the carriage. This shaft 80 has a keyway 83 running throughout its length between the bearings 81 and 82, and mounted upon the shaft is a hub 84 with a spline 85 bearing in the keyway. This hub carries an arm 86, and the door or shutter 15 has a bar 87 extending outwardly and backwardly of the device, this bar being rigidly connected to the door and preferably extending throughout the length of the door to reinforce it. The backward extension of this bar 87 and the free lower end of the arm 86 have a pitman 88 pivotally connected to them. The shaft 80 extends outward past its outer bearing 82, and a handle 89 is fixed on it and extends downward. The journals of shaft 80 are reduced in the bearings 81 and 82 so that shoulders are formed on the shaft 80 up against the sides of the bearings, and thus the handle 89 fixed to the outer end of the shaft may be used to move the carriage and the adjustable end 18 to adjust the measuring space to the required size. In addition, the shaft 80 may be rotated by the handle 89 to swing the arm 86 forwardly, and, through the pitman 88 and bar 87, swing the door or shutter 15 outward to discharge the commodity from the measuring space. The hub 84 of the arm 86 being splined to the shaft 80 these parts may remain stationary while the shaft slides inward and outward with the carriage.

Should the door 15 be opened while the slide 10 is pulled outward, the contents of the bin or other source of supply would of course flow directly through the measuring space and out of the device, without being measured. To prevent this, a lock bar 90 is connected to the arm 86 by means of a pin 91 and a lock screw 92, and extends forward and then upward through a guide 94 extending down and inward from the top of the front frame member 9. The upper end 95 of this lock bar 90 is in the plane of the lower surface of the slide 10. When the slide 10 is pushed entirely inward and properly closes the communication above referred to, the upper end 95 of the lock bar is uncovered; but this lock bar 90 is positioned so close to the outer end of the slide 10 that the slightest outward movement of the slide covers the upper end of the lock bar. This lock bar, being fixed to the arm 86 by the pin 91 and the screw 92, will be swung upward if the arm 86 is swung forward to open the door 15, and may do so when the upper end of the lock bar is uncovered; but if this upper end is covered it will prevent the forward swinging of the arm 86, and, consequently, will prevent the opening of the door 15. The upper end 95 of the lock bar 90 is preferably extended outward a considerable distance to give it ample wearing surface where it bears against the lower surface of the slide 10, and the inner part of this surface is preferably slightly inclined downward to avoid blocking of the slide 10 by the lock bar, should the lock bar for any reason be too high when the slide is to be pulled outward.

The guide 94 for the lock bar 90 is the means that holds this entire mechanism, comprising the hub 84 and arm 86 and the lock bar 90, against sliding inwardly or outwardly of the device along with the shaft 80 and carriage 48.

The slide 10 is pulled outward and pushed inward by means of a handle 96, rigidly secured to the lower surface of the slide at the rear of the pawl mechanism hereinbefore described, and extending downwardly and outwardly, and then forwardly and downwardly, preferably parallel with and in longitudinal alinement with the handle 89 by means of which the carriage 48 is moved and the door 15 is opened as above described. In order to leave ample space for this slide handle 96 between the arm 86 and the handle 89, this latter handle is preferably inclined backward and then extended downward so that there is ample space behind each of the handles for insertion of the fingers of the operator. The handle 89, of course, is grasped first, and the carriage and the adjustable end 18 drawn out as far as required; after which the handle 96 is grasped, and the slide 10 pulled out to the stop 63 on the carriage; and then immediately pushed fully inward again as permitted through the operation of the pawl mechanism hereinbefore described. Thus, both handles 89 and 96 are readily accessible, and the entire operation of adjusting the measuring space, operating the slide 10 to admit and cut off the required amount of commodity, and then the opening of the door 15, is done with these two handles, making it unnecessary to place the hand on any other part of the device during the entire dispensing operation.

The door 15 is preferably provided with a handle 97 by means of which it may be pulled open instead of by the handle 89; but of course the lock bar 90 will still operate to prevent opening of the door unless the slide 10 is fully closed. A flat spring 98, fixed to the frame member 9 near its top, extends down on the outside of the door and bears against it some distance below its hinges 16, so that the door is held tightly shut unless considerable force is exerted on it to open it. Preferably the bar 87 that extends across the door receives the lower end 99 of this flat spring 98 in a notch 100 which assists to properly maintain the position of the lower end of the spring.

Where it is desired to readily empty the bin or other source of supply for any reason, the lock bar 90 may be rendered inoperative by removing the lock screw 92, so that it partakes of only a slight lateral motion from the swinging of the arm 86, and will not engage with the lower surface of the slide 10 even if the slide be pulled open. Thus the door 15 may be fully opened while the slide 10 is fully opened, allowing the entire contents of the bin to flow out through the device.

As herein shown, the device is provided with two separate indicating devices for indicating the adjustment of the size of the measuring space. At its front side and outer end, the carriage has an arm 101 that extends under the upper part of the frame member 9 and then upward outside thereof. An elongated flat chart-slide 102 has a foot 103 rigidly secured to this arm 101, the foot being so disposed that the chart-slide extends along the outside of the front of the frame and slopes downwardly and forwardly at an angle of about 45°. Along its middle this chart-slide has a slot 104, and a support 105 extends forward and downward from the top of the frame member 9 under the chart-slide 102 with a pivot screw 106 fixed in this support and extending through the slot 104, thus forming a guide as well as support for the chart-slide, which of course will be pulled outward and pushed inward along with the carriage 48, due to its being fixed to the arm 101 of the carriage. Pivoted on this pivot screw 106 is a double-detent 107, and fixed to the chart-slide 102 along its upper edge and its lower edge, respectively, are charts 108 and 109, each having a series of notches 110 and 111, respectively, at suitable intervals therealong, in which the points 112 and 113, respectively, of the double-detent 107 may engage, accordingly as the double-detent 107 is swung to one side or the other of the chart-slide. The purpose of the two charts is to indicate value as well as weight, as the measuring space is adjusted. Thus, the upper chart 108 represents a series of values depending upon the price per weight unit of the commodity, while the lower chart indicates a series of fractions of the weight unit. The double-detent 107 is swung from one side to the other; or is swung to its mid-position to permit free sliding of the chart-slide with the carriage during adjustment of the measuring space. It is thus manipulated by means of a knob 114 fixed to it some distance from the pivot pin 106.

In order to hold the double-detent 107 in any one of the three positions which it may be required to have, a cam plate 115 slides between the charts 108 and 109, some distance inward from the pivot pin 106, being supported and held down by a tongue 116 that extends inwardly from the support 106 and up through the slot 104 and then outward over the top of the cam plate. The outer edge of this cam plate is serrated, with a middle depression 117 and lateral depressions 118 and 119 which may receive the end of an arm 120 of the double-detent 107, this arm extending inwardly from the pivot pin 106. A bowed spring 121 has its middle against the crotch of the tongue 116, and its free ends against the inner edge of the cam plate 115, thus pressing the cam plate up against the inner end of the arm 120, but allowing the cam plate to yield backward sufficiently for the end of the arm to travel from any of the depressions 117, 118 and 119 to any other one. If the end of the arm 120 is held in the middle depression 117, the double-detent engages with neither chart; but if it is in the depression 118, the point 112 of the double-detent 107 will engage in one of the notches 110 of the value chart 108 at the upper side of the chart-slide; while if the end of this arm 120 is in the other depression 119, the point 113 of the double-detent 107 will engage in one of the notches 111 of the weight chart 109 at the bottom of the chart-slide. A shield 122 is fixed to the top of the frame, and extends forwardly and slopes downwardly over the chart-slide and its charts and the detent mechanism above described. The outer end of this shield and the notches or graduations 110 and 111 on the charts are so relatively positioned that this outer end of the shield may act as the pointer to these graduations. A sight-opening 123 is cut in this outer end of the shield, through which the knob 114 of the double-detent 107 extends forward and upward. It will be understood that, with the charts properly graduated, no change of the weight chart 109 need ever be made, since variations in the specific gravity of the commodity are compensated for by raising and lowering the bottom 17 of the measuring space as hereinbefore described. However, where the price or value varies, a new chart may be substituted for the value chart 108.

The above described chart or indicating device is for the use of the operator of the device. In order to conveniently indicate to an observer, such as a customer who is buying the commodity being dispensed, another indicating mechanism is provided, comprising dials 124 and 125 at the front and rear of the bin, respectively, the front being here regarded as the side next to the operator. If the device be used with this front also facing the customer, as when it is mounted upon a wall-case back of the counter, only one such dial 124 need be used; but if the device be mounted upon the counter, what is here termed the rear side will be presented toward the customer outside or in front of the counter, and the dial 125 at this side will be desirable to indicate to the customer the adjustment of the device. As here shown, each of these dials 124 and 125 is substantially semi-circular, with a pointer 126 mounted on a shaft 127 that is common to both dials and runs from front to rear through the bottom section 2 of the bin in the space under the sloping bottom of the hopper 3 as hereinbefore alluded to. The shaft 127 is journaled in bearings 128 on the concealed sides of the dials 124 and 125.

The carriage 48 has an arm 129 at its rear side and outer end, which extends back under the upper part of the frame member 6 and then up to the rear thereof, being substantially symmetrical with the front arm 101 that connects to the chart-slide. Fixed to this rear arm 129 is a rack 130 by means of a foot 131, this rack extending along the rear of the top of the frame member 6 and being supported and guided by having a V-shaped lower side bearing in a V-shaped groove in a support 132 extending back from the upper side of the rear frame member 6. A segment gear 133 is fixed on the shaft 127 and meshes with the rack 130, the parts being so proportioned and so disposed that when the carriage 48 with the adjustable end 18 is moved throughout its range of adjustment, the pointers 126 will be rotated through semi-circles which, on the dials 124 and 125, are properly graduated to indicate, uniformly with the weight chart 109, the various adjustments of size of the measuring space as required. It will of course be understood that these dials may also be made to indicate value if desired, and new charts or graduations may be substituted on the dials where the value or price is changed.

A hood 134 is mounted across the fronts of the two devices and incloses a scale pan 135, to extend along under the door openings 14 of the devices and receive the commodity from either device when its door 15 is opened. When the scale is not to be used to verify the measurement the scale pan 135 will rest upon the conforming bottom of the hood 134, said bottom preferably having a bead 136 entirely around it near its junction with the main part of the hood, into which bead the rim of the scale pan 135 is tightly received, so that there can be no leakage of the commodity under the scale pan between it and the bottom of the hood. The hood terminates downwardly in a short neck 137, and the scale pan 135 has a long neck 138 that extends loosely through this neck 137 and is provided with a disk shaped shutter 139 adapted to lie across the interior of the neck 138, and having a handle 140 outside the neck by which it may be turned halfway over. Thus this shutter 139 may be made to hold the commodity within the scale pan, or permit it to escape therefrom into the container in which it is to be finally dispensed.

When the dry measurement is to be verified, the scale pan 135 is connected to a suitable scale mechanism by means of a C-bar 141 which lies at the rear of the hood 134, in the space left by having the main apparatus separated some distance as hereinbefore mentioned.

The adjustable end 18 may consist of any number of the shells, depending upon the range of adjustment required of the bottom 17. This will depend upon the range of densities of the materials to be dispensed. Where the device is to be used for only one commodity at all times there may be a minimum range of adjustment, so that some of the shells could be dispensed with, even limiting the structure to a shell, such as the uppermost shell 41, and a foot like the foot 46, made to fit this shell. Where the use of the device is to be more universal, however, a number of shells, such as here shown and described, is preferable. In order that this adjustable end 18 thus made up of a comparatively large number of shells may be collapsed to the fullest practical extent in connection with the use of the V-shaped guides 56, each shell has its top cut away obliquely at each side 142, so that the tops of all of the shells may come up above the plane of the lower side of these guides when the adjustable end 18 is fully collapsed. The uppermost shell 41, which is fixed to the end of the carriage as above described, has notches 143 coinciding with the grooves of the carriage which thus slide along the guides 56.

As best shown in Fig. 12, the door or shutter 15 in the side 13 has its inner side 144 smooth and in the plane of the smooth inner surface of the side 13, so as to make efficient junction with the adjustable end 18 at all adjustments when the door or shutter is closed. The upper and lower edges 145 and 146 of the opening 14 are, respectively, inclined upwardly and downwardly forwardly, and the corresponding edges 147 and 148 of the shutter 15 are inclined to fit these edges of the door opening closely. This makes the interior surfaces of the side 13 and shutter 15 practically continuous when the shutter 15 is closed, but permits the shutter 15 to open readily; while the downwardly inclined upper edge of the shutter and lower edge of the door opening 14 allow the material to slide freely off of them avoiding clogging, which would involve inaccuracy, and also interfere with the closing of the shutter 15.

As best shown in Fig. 4, the bottom 17 may have a pointer 149 on the lower outer corner of the apron 28, projecting through a vertical slot 150 in the front member 9 alongside the hood 134. A series of graduations 151 may be provided along the outer side of this slot, by means of which the pointer 149 may indicate the movement of the bottom 17 up and down during its adjustment to compensate for variations in density of the material dispensed. While each such adjustment must be very carefully made and cannot be arbitrary to the extent that will permit the exactly proper adjustment for various commodities to be indicated in these series of graduations, the provision of these and the pointer make it more convenient to adjust approximately, after which the exact adjustment required will be obtained by trial and comparison with an accurate weighing device, which may be the one provided in conjunction with the apparatus, or any other.

The top of the hood 134 is left open in front of the doors 15, but slightly overlaps the door 15, so that when the door is swung outward it comes against the overlapping parts of the hood or chute and forms a baffle to prevent spillage of the commodity over the upper edges of the hood or chute.

The outer end 7 of the frame of each device is preferably left open in front to afford free access of the hand to the handles 89 and 96 as best shown in Fig. 3.

While I have shown and described in considerable detail an example of an embodiment of my invention, I do not wish to be understood as being limited to the specific details shown, since my invention is capable of considerable modification without departure from the scope and spirit thereof, as expressed in the following claims:

1. In dispensing apparatus, a normally empty measuring compartment comprising a bottom and an end substantially horizontally adjustable over said bottom in said compartment while said compartment is empty, to create and define an empty measuring space in said compartment, and means for admitting, under the action of gravity, a commodity to the empty measuring space thus created and defined.

2. In dispensing apparatus, a normally empty measuring compartment comprising a bottom and an end horizontally adjustable over said bottom in said compartment while the compartment is empty, to create and define an empty measuring space in said compartment, and substantially horizontally operated inlet and cut-off means for admitting, under the action of gravity, a commodity to the empty measuring space thus created and defined.

3. In dispensing apparatus, a normally empty measuring compartment comprising a bottom and an end substantially horizontally adjustable over said bottom in said compartment while said compartment is empty, to create and define an empty measuring space in said compartment, means for admitting, under the action of gravity, a commodity to the empty measuring space thus created and defined, and means distinct from said adjustable end for discharging the commodity from said measuring space under the action of gravity.

4. In dispensing apparatus, a normally empty measuring compartment comprising a bottom and an end rectilinearly adjustable over said bottom in said compartment while said compartment is empty, to create and define an empty measuring space in said compartment, and inlet and cut-off means for admitting a commodity to the empty measuring space thus created and defined, said inlet and cut-off means being operated substantially parallel to the line of adjustment of said end.

5. In dispensing apparatus, a normally empty measuring compartment comprising a bottom and an end rectilinearly adjustable over said bottom in said compartment while said compartment is empty, to create and define an empty measuring space in said compartment, and inlet and cut-off means for admitting a commodity to the empty measuring space thus created and defined, said inlet and cut-off means being operated substantially parallel to the line of adjustment of said end, and means operating in a plane substantially at right angles to the line of adjustment of said end for discharging the commodity from said measuring space.

6. In dispensing apparatus, a normally empty measuring compartment comprising a bottom and an end rectilinearly adjustable over said bottom in said compartment while said compartment is empty, to create and define an empty measuring space in said compartment, inlet and cut-off means for admitting a commodity to the empty measuring space thus created and defined, and means for discharging the commodity from said measuring space, said inlet and cut-off means and said discharging means being distinct from said adjustable end.

7. In dispensing apparatus, a normally empty measuring compartment comprising an end rectilinearly adjustable in said compartment while said compartment is empty, to create and define an empty measuring space in said compartment, inlet and cut-off means for admitting a commodity to the empty measuring space thus created and defined, means for discharging the commodity from said measuring space, said inlet and cut-off means and said discharging means being distinct from said adjustable end, and means for preventing the cut-off operation of said means until its inlet operation has been completed to the full extent of the measuring space.

8. In dispensing apparatus, a normally empty measuring compartment comprising an end rectilinearly adjustable in said compartment while said compartment is empty, to create and define an empty measuring space in said compartment, inlet and cut-off means for admitting a commodity to the empty measuring space thus created and defined, means for discharging the commodity from said measuring space, said inlet and cut-off means and said discharging means being distinct from said adjustable end, and means for preventing simultaneous operation of the inlet and cut-off means and the discharging means.

9. In dispensing apparatus, a normally empty measuring compartment comprising an end rectilinearly adjustable in said compartment while said compartment is empty, to create and define an empty measuring space in said compartment, inlet and cut-off means for admitting a commodity to the empty measuring space thus created and defined, means for preventing the cut-off operation of said means until its inlet operation has been completed to the full extent of the measuring space, and means for preventing simultaneous operation of the inlet and cut-off means and the discharging means.

10. In dispensing apparatus, a normally empty measuring compartment comprising an end rectilinearly adjustable in said compartment while said compartment is empty, to create and define an empty measuring space in said compartment, inlet and cut-off means for admitting a commodity to the empty measuring space thus created and defined, means for discharging the commodity from said measuring space, said inlet and cut-off means and said discharging means being distinct from said adjustable end, and means associated with said adjustable end to vary the size of the measuring space thus created, proportionately at all adjustments of said end.

11. In dispensing apparatus, a normally empty measuring compartment comprising an end rectilinearly adjustable in said compartment while said compartment is empty, to create and define an empty measuring space in said compartment, inlet and cut-off means for admitting a commodity to the empty measuring space thus created and defined, means for discharging the commodity from said measuring space, said inlet and cut-off means and said discharging means being distinct from said adjustable end, means for preventing simultaneous operation of the inlet and cut-off means and the discharging means, means receiving the material discharged from said measuring space, an additional space receiving material independently of the inlet and cut-off means for the measuring space, and means for discharging material from this additional space to the means that receives the material discharged from the measuring space.

12. In dispensing apparatus, a measuring compartment comprising an end adjustable in it to create and define a measuring space in said compartment, inlet and cut-off means for the measuring space thus created and defined, means for preventing the cut-off operation of said means until its inlet operation has been completed to the full extent of the measuring space, indicating means connected to said end adjacent to the discharging means for said space, and other indicating means connected to said end and disposed on the other side of the apparatus from said discharging means, each of said indicating means indicating the size of the space created and defined by the adjustment of said end.

13. In dispensing apparatus, a measuring compartment comprising an end adjustable inwardly and outwardly thereof to create and define a measuring space therein, inlet and cut-off means comprising a slide, and an additional space receiving material independently of said inlet and cut-off means, into which space the end of said slide extends in the cutting-off operation.

14. In dispensing apparatus, a measuring compartment comprising an end adjustable inwardly and outwardly thereof to create and define a measuring space therein, inlet and cut-off means comprising a slide, and an additional space receiving material independently of said inlet and cut-off means, into which space the end of said slide extends in the cutting-off operation, and a hinged member forming a partition between the measuring space and this additional space, adjacent to said slide, and adapted to swing over into said additional space upon engagement of material between the slide and this hinged member, and means to swing said member back out of said additional space when the material is disengaged therefrom.

15. In dispensing apparatus, a measuring compartment comprising an end adjustable inwardly and outwardly thereof to create and define a measuring space therein, inlet and cut-off means comprising a slide, and an additional space receiving material independently of said inlet and cut-off means, into which space the end of said slide extends in the cutting-off operation, means receiving the material discharged from the measuring space, and outlet means from said additional space into this receiving means.

16. In dispensing apparatus, a measuring compartment comprising an end adjustable in it to create and define a measuring space in said compartment, inlet and cut-off means, discharging means for the measuring space thus created and defined, and means for preventing simultaneous operation of the inlet and cut-off means and the discharging means, this means comprising means for rendering it inoperative and permitting said simultaneous operation, for the purpose set forth.

17. In dispensing apparatus, a rear side, a front side, an inner end, and a bottom, a slide moving between the front and rear sides and over the inner end, and an adjustable outer end between said front and rear sides and said slide and said bottom, adapted, by adjustment, to create and define an empty measuring space under said slide, and said slide being movable to admit material to the empty measuring space thus created and defined and to cut off the material thus admitted to the measuring space.

18. In dispensing apparatus, a rear side, a front side, an inner end, and a bottom, a slide moving between the front and rear sides and over the inner end, and an adjustable outer end between said front and rear sides and said slide and said bottom, adapted, by adjustment, to create and define a measuring space under said slide, and said slide being movable to admit material to the measuring space thus created and defined and to cut off the material thus admitted to the measuring space, and ratchet means, part of which is moved with said adjustable end and part of which is moved with said slide, said parts coöperating to prevent movement of the slide to cut off the material until the slide has been moved to admit material the full extent of the measuring space created and defined by the adjustable end.

19. In dispensing apparatus, a rear side, a front side, an inner end, and a bottom, a slide moving between the front and rear sides and over the inner end, and an adjustable outer end between said front and rear sides and said slide and said bottom, adapted, by adjustment, to create and define a measuring space under said slide, and said slide being movable to admit material to the measuring space thus created and defined and to cut off the material thus admitted to the measuring space, said front side having an outlet opening, and said bottom sloping to said opening, and a shutter for the outlet opening swinging outwardly therefrom to discharge material from the measuring space.

20. In dispensing apparatus, a rear side, a front side with a discharge opening, an inner end, and a bottom sloping to said discharge opening, a slide moving between the front and rear sides and over the inner end, and an adjustable outer end between said front and rear sides and said slide and said bottom, adapted, by adjustment, to create and define a measuring space under said slide, and said slide being movable to admit material to the measuring space thus created and defined and to cut off the material thus admitted to the measuring space, an outwardly-swinging shutter over said discharge opening, operative means connected to said shutter to swing it outward, and locking means connected with the operating means, adapted to pass said slide when it is moved to its full extent to cut off the material but to engage with said slide when not so moved, whereby simultaneous admission and discharge of material to and from said measuring space is prevented.

21. In dispensing apparatus, a rear side, a front side, an inner end, and a bottom, a slide moving between the front and rear sides and over the inner end, and an adjustable outer end between said front and rear sides and said slide and said bottom, adapted, by adjustment, to create and define a measuring space under said slide, and said slide being movable to admit material to the measuring space thus created and defined and to cut off the material thus admitted to the measuring space, said front side having an outlet opening, and said bottom sloping to said opening, a shutter for the outlet opening swinging outwardly therefrom to discharge material from the measuring space, and ratchet means, part of which is moved with said adjustable end and part of which is moved with said slide, said parts coöperating to prevent movement of the slide to cut off the material until the slide has been moved to admit material the full extent of the measuring space created and defined by the adjustable end.

22. In dispensing apparatus, a rear side, a front side, an inner end, and a bottom, a slide moving between the front and rear sides and over the inner end, and an adjustable outer end between said front and rear sides and said slide and said bottom, adapted, by adjustment, to create and define a measuring space under said slide, and said slide being movable to admit material to the measuring space thus created and defined and to cut off the material thus admitted to the measuring space, said bottom being adjustable up and down between said sides, and said adjustable end comprising means whereby it is collapsed and expanded in accordance with the up-and-down adjustment of said bottom.

23. In dispensing apparatus, a rear side, a front side, an inner end, and a bottom, a slide moving between the front and rear sides and over the inner end, and an adjustable outer end between said front and rear adapted, by adjustment, to create and define a measuring space under said slide, and said slide being movable to admit material to the measuring space thus created and defined and to cut off the material thus admitted to the measuring space, said bottom being adjustable up and down between said sides, and said adjustable end comprising means whereby it is collapsed and expanded in accordance with the up-and-down adjustment of said bottom, the inner side of said adjustable end being inclined inwardly from its bottom upward, and the inner end being inclined substantially parallel with said inward inclination, and means for guiding said bottom parallel with said inclination with its inner edge against said inclined inner end, for the purposes set forth.

24. In dispensing apparatus, a rear side, a front side, an inner end, and a bottom, a slide moving between the front and rear sides and over the inner end, and an adjustable outer end between said front and rear sides and said slide and said bottom, adapted, by adjustment, to create and define a measuring space under said slide, and said slide being movable to admit material to the measuring space thus created and defined and to cut off the material thus admitted to the measuring space, said bottom being adjustable up and down between said sides, said adjustable end comprising means whereby it is collapsed and expanded in accordance with the up-and-down adjustment of said bottom, said front side having an outlet opening, and an apron on said bottom covering the lower part of the outlet opening as the bottom is adjusted upward.

25. In dispensing apparatus, a rear side, a front side, an inner end, and a bottom, a slide moving between the front and rear sides and over the inner end, and an adjustable outer end between said front and rear sides and said slide and said bottom, adapted by adjustment, to create and define a measuring space under said slide, and said slide being movable to admit material to the measuring space thus created and defined and to cut off the material thus admitted to the measuring space, said front side having an outlet opening and said bottom sloping to said opening, and a shutter for the outlet opening hinged at the upper side of the opening to swing outwardly and upwardly therefrom, and means receiving the material discharged from the opening and having a top cut away to allow access to said door, but with parts overlapping the door against which the door abuts when swung outward and upward, whereby said top and said door form a baffle to prevent spillage of the material as it is discharged into said means.

26. In dispensing apparatus, a bin comprising a bottom section, and a sloping bottom or hopper contained in the bottom section, a dry measuring device mounted under the bottom section and receiving material from the hopper, and indicating means connected to the dry measuring device, part of said indicating means being located within said bottom section under said sloping bottom or hopper.

27. In dispensing apparatus, a bin comprising a bottom section, and a sloping bottom or hopper contained in the bottom section, a dry measuring device mounted under the bottom section and receiving material from the hopper, and indicating means connecting to the dry measuring device, part of said indicating means being located within said bottom section under said sloping bottom or hopper, a dial on the exterior of said bottom section adjacent to the dry measuring device, and a dial on the exterior of said bottom section on the side opposite from the dry measuring device, said indicating means comprising pointers moving outside both of said dials, for the purpose set forth.

28. In dispensing apparatus, a bin comprising two distinct compartments, hoppers for the respective compartments in the bottom of the bin and discharging downwardly, and dry-measuring devices mounted under the respective hoppers to receive commodities from the respective hoppers, with a space between them to receive weighing means, each of said devices comprising discharging means, and a single means common to said dry-measuring devices extending past said space to admit part of the weighing means for receiving the commodities discharged from said devices.

29. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, and means for moving and guiding said outer end to create and define a measuring space between it and said members, inner end, bottom and slide.

30. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, a carriage under said slide, and guiding means for said carriage on said members, said outer end being carried by said carriage to create and define a measuring space between it and said members, inner end, bottom and slide.

31. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, a carriage carrying said outer end under said slide, guiding means for said carriage, an outer stop on said carriage for the slide, said carriage having a series of ratchet teeth along it terminated outwardly by a lug projecting above the ratchet teeth, a pawl on said slide engageable with the ratchet teeth to prevent inward but to permit outward movement of the slide relative to the carriage and outer end, an outer nose on said pawl, a detent on said slide having a downward projection with the rear side of which said nose may engage and move as the pawl passes over the ratchet teeth, but with its lower end adapted to pass over said nose when the pawl engages with said lug and hold the pawl from the ratchet teeth, an upward projection on said detent, and a releasing hook to ride over and engage with the outer side of said upward projection as the slide moves inward, and then, on outward movement of the slide, to detain said upward projection to release the pawl.

32. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, a carriage under the slide with grooves presented toward said members, guides along said members engaging in said grooves with upper surfaces inclined downward between the members, said outer end having notches receiving the guides and being carried by the carriage along the guides to create and define a measuring space between said ends, members, bottom and slide.

33. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, means for moving and guiding said outer end to create and define a measuring space between it and said members, inner end, bottom and slide, said bottom being adjustable up and down between said members, and said outer end being made up of a series of parts adapted to slide relative to each other as the bottom is adjusted up and down.

34. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, a carriage under the slide with grooves presented toward said members, guides along said members engaging in said grooves with upper surfaces inclined downward between the members, said outer end having notches receiving the guides and being carried by the carriage along the guides to create and define a measuring space between said ends, members, bottom and slide, said bottom being adjustable up and down between said members, and said outer end being made up of a series of parts adapted to slide relative to each other as the bottom is adjusted up and down, each of these parts being cut away at its sides to permit it to rise above the lower edges of said guides.

35. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, means for moving and guiding said outer end to create and define a measuring space between it and said members, inner end, bottom and slide, said bottom being adjustable up and down between said members, and said outer end being made up of downwardly overlapping shells, the lowermost shell bearing upon said bottom, and the uppermost shell bearing against said slide, and means to cause expansion or allow contraction of said outer end thus made up.

36. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, means for moving and guiding said outer end to create and define a measuring space between it and said members, inner end, bottom and slide, said bottom being adjustable up and down between said members, and said outer end being made up of a series of shells of substantially inverted U-shaped cross section with each shell received in the shell above it in the series, the lowermost shell bearing upon said bottom, and the uppermost shell bearing against said slide, and a spring between the top of each shell and the top of the adjacent upper shell, these springs acting collectively to cause expansion or allow contraction of said outer end thus made up.

37. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, means for moving and guiding said outer end to create and define a measuring space between it and said members, inner end, bottom and slide, said bottom being adjustable up and down between said members, and said outer end being made up of a series of downwardly overlapping shells, the lowermost shell bearing upon said bottom, and the uppermost shell bearing against said slide, means to cause expansion or allow contraction of said outer end thus made up, and means in the respective shells whereby adjacent shells guide each other in their contracting and expanding movements.

38. In dispensing apparatus, a measuring compartment comprising an end adjustable in it to create and define a measuring space, said measuring compartment having a lateral outward opening, and an outwardly swinging shutter for said opening, having, when closed, its inner surface substantially in a plane with the interior surface of the compartment, the upper and lower edges of said opening being flared outwardly, and the upper and lower edges of said shutter being inclined to fit closely against the edges of the opening.

39. In dispensing apparatus, a measuring compartment comprising an end adjustable in it to create and define a measuring space, a chart slide and supporting and guiding means therefor outside said compartments, means connecting said chart slide to said end, a chart extending along the chart slide, and a detent connected to said supporting and guiding means and engaging with the chart.

40. In dispensing apparatus, a measuring compartment comprising an end adjustable in it to create and define a measuring space, a chart slide and supporting and guiding means therefor outside said compartment, means connecting said chart slide to said end, charts extending along the chart slide, and a double detent connected to said supporting and guiding means and movable for engaging with either one of said charts.

41. In dispensing apparatus, a measuring compartment comprising an end adjustable in it to create and define a measuring space, a chart slide and supporting and guiding means therefor outside said compartment, means connecting said chart slide to said end, charts extending along the chart slide, and a double detent connected to said supporting and guiding means and movable for engaging with either one of said charts, and means to hold said double detent in mid-position out of engagement with both charts, or in position to engage with either chart.

42. In dispensing apparatus, a measuring compartment comprising an end adjustable in it to create and define a measuring space, a chart slide and supporting and guiding means therefor outside said compartment, means connecting said chart slide to said end, charts extending along the chart slide, and a double-detent connected to said supporting and guiding means and movable for engaging with either one of said charts, or to occupy a mid-position in engagement with neither chart, an arm on said double-detent on the opposite side of its pivotal mounting, a cam-plate slidably mounted between the charts on the chart slide, having its edge adjacent to the end of said arm, and provided with a middle depression, and lateral depressions adjacent to the respective charts, any one of which depressions may receive the end of the arm and hold the double detent in any of the aforesaid positions, an extension on the guiding and supporting means projecting through said slot in the chart slide and over the cam-plate, holding said cam-plate down on the chart slide, and a spring between said extension and said cam-plate, yieldably holding said cam-plate toward said arm, for the purposes set forth.

43. In dispensing apparatus, a measuring compartment comprising an end adjustable in it to create and define a measuring space, a chart-slide and means supporting and guiding said chart-slide outside said compartment, means connecting the chart-slide to said end, and a shield outside said compartment and extending over the chart slide.

44. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, means for moving and guiding said outer end to create and define a measuring space between it and said members, inner end, bottom and slide, said front member having an outlet opening, and said bottom sloping forward thereto, a shutter over said outlet opening, rotatable means sliding with said outer end and comprising a handle therefor, and operative means connected to said shutter and engaging with the rotatable means to be rotated with it to open said shutter but to permit the rotatable means to slide with said end relative to said operative means, said handle being thus adapted for sliding said outer end and for opening said shutter.

45. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, means for moving and guiding said end to create and define a measuring space between it and said members, inner end, bottom and slide, said front member having an outlet opening, and said bottom sloping forward thereto, a shutter over said outlet opening, rotatable means sliding with said outer end and comprising a handle therefor, operative means connected to said shutter and engaging with the rotatable means to be rotated with it to open said shutter, but to permit the rotatable means to slide with said end relative to said operative means, said handle being thus adapted for sliding said outer end and for opening said shutter, and a lock bar connected to said operative means and extending up to the plane of the lower side of the slide when said shutter is closed, but raised above said plane when the shutter is opened, preventing opening of the shutter while the slide is moved outward.

46. In dispensing apparatus, a measuring compartment comprising an end adjustable in it to create and define a measuring space, a rack connected to said end and extending along outside said compartment, a support and guide for the rack, a dial, a shaft, a pointer on the shaft moving before the dial, and a gear fixed on the shaft and meshing with said rack, whereby adjustment of said end is indicated on said dial.

47. In dispensing apparatus, a measuring compartment comprising an outer end adjustable in it to create and define a measuring space, a bottom for said compartment, guides for said bottom, whereby it is slidable up and down, said outer end being adjustable to the up-and-down sliding of said bottom, a bracket and bearings fixed relative to said compartment under said bottom, a threaded stud fixed on the bottom and projecting down through said bracket, a bevel gear threaded on said stud above said bracket, a stem in said bearings, a bevel gear fixed on said stem and in mesh with the bevel gear on the stud, and means on said stud projecting past the outer end of said bottom for turning said stem.

48. In dispensing apparatus, a measuring compartment comprising an outer end adjustable in it to create and define a measuring space, a bottom for said compartment, and guides for said bottom whereby it is slidable up and down, said outer end being adjustable to the up-and-down sliding of said bottom, the inner side of said outer end having an inward inclination, and said guides for said bottom being inclined parallel to said inclination, whereby said bottom remains close to said inner end as it slides up and down.

49. In dispensing apparatus, a rear member and a front member, an inner end and a bottom extending between said members with their inner edges adjoining, a slide, guideways for the slide near the upper edges of said members, whereby the slide may move longitudinally over said inner end, supply means above the slide, an outer end between said members, bottom and slide, means for moving and guiding said end to create and define a measuring space between it and said members, inner end, bottom and slide, said bottom being adjustable up and down between said members, and said outer end being made up of a series of downwardly overlapping shells, whereby its inner side has an inclination inwardly, said inner end being inclined to conform to said inclination, means to cause expansion or allow contraction of said outer end thus made up, and means for adjusting and guiding said bottom up and down parallel to the inclination of said inner end.

WILLIAM PATTON.

Witnesses:
ALBERT BECK,
CHARLES WEBER.